United States Patent
O'Donnell

(10) Patent No.: US 10,705,015 B2
(45) Date of Patent: Jul. 7, 2020

(54) SYSTEM, METHOD AND APPARATUS FOR CONTINUOUS EVALUATION, DETECTION AND STORAGE OF COLORIMETRIC WAVELENGTH CHANGES ON A CHEMICALLY IMPREGNATED MEDIA USEFUL IN THE DETECTION OF GASES

(71) Applicant: Daniel O'Donnell, Algonquin, IL (US)

(72) Inventor: Daniel O'Donnell, Algonquin, IL (US)

( * ) Notice: Subject to any disclaimer, the term of this patent is extended or adjusted under 35 U.S.C. 154(b) by 84 days.

(21) Appl. No.: 16/048,652

(22) Filed: Jul. 30, 2018

(65) Prior Publication Data
US 2019/0049366 A1  Feb. 14, 2019

Related U.S. Application Data

(60) Provisional application No. 62/544,169, filed on Aug. 11, 2017.

(51) Int. Cl.
| | |
|---|---|
| *G01N 21/25* | (2006.01) |
| *G01N 21/78* | (2006.01) |
| *G01J 3/10* | (2006.01) |
| *G01J 3/50* | (2006.01) |

(52) U.S. Cl.
CPC .............. *G01N 21/251* (2013.01); *G01J 3/10* (2013.01); *G01J 3/50* (2013.01); *G01J 3/501* (2013.01); *G01N 21/255* (2013.01); *G01N 21/783* (2013.01); *G01N 2201/062* (2013.01)

(58) Field of Classification Search
CPC .... G01J 3/10; G01J 3/50; G01J 3/501; G01N 21/255; G01N 21/783; G01N 2201/062
See application file for complete search history.

(56) References Cited

U.S. PATENT DOCUMENTS

| | | | |
|---|---|---|---|
| 4,158,505 A * | 6/1979 | Mathisen | G01J 3/02 356/308 |
| 5,137,364 A | 8/1992 | McCarthy | |
| 2005/0042136 A1* | 2/2005 | Marganski | G01N 21/783 422/400 |
| 2007/0158210 A1* | 7/2007 | Stromereder | G01N 33/0031 205/775 |
| 2008/0050839 A1 | 2/2008 | Suslick et al. | |

(Continued)

*Primary Examiner* — Dominic J Bologna
(74) *Attorney, Agent, or Firm* — Stephen T. Scherrer; Monique A. Morneault; Scherrer Patent & Trademark Law, P.C.

(57) ABSTRACT

The present disclosure relates to system, method and apparatus including a chemically impregnated media, a fixed, white broad spectrum LED source, a recording device having a digital imaging sensor and a microprocessor, is provided. The recording device captures real-time video images of color changes that occur on the chemically treated media during exposure to a gas specimen indicating a targeted substance is responding on the media. The continuous video images are transmitted to the microprocessor and evaluated with a proprietary algorithm loaded onto the microprocessor, which can efficiently determine gas concentration, as well as, individual species of target gas or gases landing on the specific chemically treated media. The captured video recording of the media color change provides a record of the events for later verification and evaluation of a particular gas detection event.

15 Claims, 3 Drawing Sheets

(56) References Cited

U.S. PATENT DOCUMENTS

| | | | |
|---|---|---|---|
| 2009/0301381 A1* | 12/2009 | Robins | G01N 31/223 |
| | | | 116/201 |
| 2010/0166604 A1* | 7/2010 | Lim | G01N 21/253 |
| | | | 422/400 |
| 2012/0202294 A1 | 8/2012 | Jin | |
| 2017/0102335 A1* | 4/2017 | Suslick | G01N 21/77 |
| 2018/0074028 A1* | 3/2018 | Gerber | A61B 5/08 |

* cited by examiner

SYSTEM, METHOD AND APPARATUS FOR CONTINUOUS EVALUATION, DETECTION AND STORAGE OF COLORIMETRIC WAVELENGTH CHANGES ON A CHEMICALLY IMPREGNATED MEDIA USEFUL IN THE DETECTION OF GASES

TECHNICAL FIELD

The present disclosure relates to colorimetric optical media detection of gases. This current technique and application is generally targeted for the continuous colorimetric gas detection of toxic, corrosive, pyrophoric and flammable gases. More particularly, the present disclosure relates to a system, method and apparatus for detection of potentially multiple types of gases using the same media by using a fixed, broad spectrum light emitting diodes (LED) light source in conjunction with a digital imaging sensor. The present apparatus can efficiently differentiate, via proprietary software, targeted gases on the same media, while storing relevant data relating to the targeted gases in a pictorial format to view and evaluate for verification of an incident at a later time.

BACKGROUND

Portable and fixed gas detection systems are necessary devices for use in all forms of industry, manufacturing and first responder situations where toxic gases may be present. Having reliable, accurate gas detection systems in these situations are invaluable for keeping workplaces and employees safe from explosions, fire, suffocation, and other injuries related to the inhalation of toxins. Portable gas detection monitors allow for testing for dozens of gases wherever and whenever there is a need to test air quality. Fixed gas detection systems serve as a constant source of protection, continuously monitoring air quality and providing active feedback for review.

Optical systems used along with chemically-treated paper tape are known in the art of gas detection systems. For example, some low level gas detection systems have been used in the detection of gases by flowing gas to the detection tape, while simultaneously reading reflected photons in the grey scale to interpret gas concentration.

In known gas detection systems, chemically-impregnated tape is placed in series with the flow of gas and the optical system with a fixed green, blue or red LED light depending on expected color change for best grey scale change on photodiode. The photodiode measures a reflection from the treated tape. When the chemically-impregnated tape is exposed to the gas flow and the target gas is present, the tape discolors causing less photons to reach the photodiode. A microprocessor is used to analyze the results from the photodiode to determine the type and concentration of the gas exposed to the tape.

Typically, a family of gases will cause this discoloration on chemically-impregnated tape, however, making it difficult to detect exactly which type or species of gas was causing the discoloration. For example, a tape impregnated to respond to Hydride gases will respond differently to different Hydride family gases, producing different colors. However, initial optic systems could not differentiate different colors, and thus, the particular species of gas could not be detected, resulting in potentially an inaccurate response to the particular gas.

Current optic systems used in gas detectors typically use an adjustable LED RGB (Red, Green, and Blue) light source to scan or produce different source colors, i.e., scan different wavelengths, and using a standard photo diode and wavelength spectrum analyzer, try differentiate the paper tape stain colors, and thus, determine a specific gas. This process has not proven to be effective because of the time it takes to scan, LED RGB source tolerances, expense, and the fact the color is constantly changing during gas to gas exposure. The current LED RGB scanning source, photodiode, wavelength analyzer scanning system has not proven to increase sensitivity, or offer an efficient or cost effective solution to differentiate species on a chemically impregnated paper tape. The result is potentially invalid interpretation of the actual incident, with no visual recorded evidence.

Therefore, there is a continuing, ongoing need for real-time colorimetric gas detectors that can differentiate specific colors as they change on the impregnated media, such as a treated tape, thereby providing more accurate detection of specific gases. Additionally, a need exists for an improved system, method and gas detection apparatus that not only differentiates colors for the detection of different species of gases on same media, but visually records and saves the event for review and critical record keeping. As there is typically an investigation after an event, it is important to have a record of the event so that verification of whether it was a true gas alarm or a false gas alarm can be determined.

A need further exists for an improved system, method and apparatus for the detection of gases in real-time, which is useful as a safety and evacuation device in a variety of industries and manufacturing facilities.

Moreover, a need exists for an improved system, method and apparatus for efficient, accurate and cost-effective detection of specific species of gases on a chemically-impregnated media during a gas detection event.

Additionally, a need exists for an improved system, method and apparatus for capturing and recording the chemically-impregnated media color change during its exposure to the subject gas or gases. The advantage offered by the present apparatus is that the gas event is saved for later analysis and record-keeping, as well as, for verification of the event as to whether it was a true gas alarm or a false alarm provided by physical evidence of a stain development on the detection media.

SUMMARY

The present disclosure relates to a system, method and apparatus for the detection of gases. Specifically, the present disclosure provides an improved system, method and gas detection apparatus that not only differentiates colors for the detection of different species of gases on the same chemically-impregnated media, but visually records and saves the event for review, verification and critical record keeping of the event at a later date. In this manner, continuous recordation of images of color change during exposure to subject gas or gases are provided wherein proprietary algorithms can efficiently determine gas concentration, as well as, identify specific species of gases on the specially-treated media. Additionally, the present system, method and apparatus provides a real-time analysis of the subject gas or gases as they are exposed to the treated media, while recording the event for later evaluation and analysis.

To this end, in an embodiment of the present disclosure, a system for detection of gases is provided. The system includes providing an apparatus comprising an optic block having an inlet for entry of the subject gas flow, and an outlet for exiting the subject gas flow from the apparatus, a chemically-treated media positioned near the flow of gas, an LED light source, a digital imaging sensor connected with a microprocessor loaded with a software algorithm for use in detection of specific gas species, as well as calculations of concentration levels of same in real-time. Through the digital imaging sensor, the system further provides captured, streaming video recordings of the chemically-treated media color change, as it is exposed to the subject gas or gases. The video recordings provide a record of the event for later evaluation and verification of the particular gas or gasses.

In an embodiment of the present disclosure, an apparatus for gas detection and evaluation is provided. The apparatus comprises an optic block having an inlet for entry of a gas flow specimen into the housing, and an outlet for exiting the gas flow specimen, wherein the inlet and outlet are connected by at least one gas flow channel, a chemically-treated media positioned proximate to the gas flow channel and between the inlet and the outlet for receiving the gas flow specimen, a broad spectrum LED light source for illuminating the media as it is exposed to the gas flow specimen, and at least one digital imaging sensor (SOC) for optically measuring a stain created by the gas flow specimen on the media. The apparatus includes a digital imaging sensor for capturing continuous video images of changes to the media as it is exposed to the subject gas flow specimen. The apparatus further includes a microprocessor for operation of the LED light source and digital imaging sensor. Additionally, the microprocessor incorporates an algorithm useful for evaluating the subject gas as it reacts to the chemically-treated media, to determine gas species and concentrations, which are collected by the digital imaging sensor, recorded and stored.

In another embodiment of the present disclosure, a method of gas detection and evaluation is provided. The method comprises the steps of providing an optic block having a plurality of channels, flowing a gas sample into an inlet and through at least one of the plurality of channels and across a chemically-treated media, reacting the chemically-treated media with the gas sample to produce a stain, transmitting a broad spectrum LED light source through at least one of the plurality of channels toward the chemically-treated media, reflecting color changes to the stain through at least one of the plurality of channels to a digital imaging sensor, and, measuring color changes to the stain using a digital imaging sensor. The method further includes taking continuous video images of the stain, determining individual species of target substances on the chemically-treated media, and storing the images for later evaluation.

In a further embodiment of the present disclosure, system of gas detection and recordation of a gas detection event in real-time, is provided. The system comprises providing a gas flow specimen requiring detection, providing a gas detection device comprising an optic block having an inlet for entry of a gas flow specimen and an outlet for exiting the gas flow specimen, wherein the inlet and outlet are connected by at least one gas flow channel, a chemically-treated media positioned proximate to the gas flow channel and between the inlet and the outlet for receiving the gas flow specimen, a broad spectrum LED light source for illuminating the media as it is exposed to the gas flow specimen, a digital imaging sensor, and a microprocessor for operating the LED light source and digital imaging sensor, recording the gas flow event through the digital imaging sensor, and, storing the recording of the gas flow event for later analysis and verification of at least one gas component of the gas flow event.

It is, therefore, an advantage and objective of the present disclosure to provide an improved system, method and apparatus for detection of gases in real-time. The present apparatus is used in both portable and fixed gas detection systems, which are necessary devices for use in all forms of industries, manufacturing and first responder situations where toxic gases may be present.

It is a further advantage and objective of the present disclosure to provide an improved system, method and apparatus providing improved sensitivity and reliability relating to the detection of individual species of gases and concentrations of same. With this improved method of gathering data from the surface of the media, new algorithms can separate previous cross interferences causing false indications (such as dust particles and smoke particles) from actual gas stain accumulation.

It is further an advantage and objective of the present disclosure to provide an apparatus capable of recording real-time video imaging of color changes to a chemically-treated media, as the gas detection event happens, for improved detection of specific gasses, verification of real gas alarms and elimination of false positive detections and avoidance.

It is yet another advantage and objective of the present disclosure to provide a system, method and apparatus capable of storing the visual recordings of chemically-treated media color changes based on gas detection events, which are useful for additional evaluation and analysis at a later date.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure relates to systems, methods and apparatus for gas detection for use in a variety of industries, manufacturing and first-responder situations where toxic or harmful gases may be present. Specifically, the present disclosure provides an improved system, method and gas detection apparatus, which differentiates colors for the detection of different species of gases on the same chemically-treated media in real-time. The present apparatus also eliminates false positives by disseminating between dust, dirt and other contaminants, and real colorimetric events.

The present apparatus is further capable of visually recording the gas detection event for review and analysis at a later date, as well as, critical record keeping. In this manner, continuous recordation of images of the gas detection event are provided to a microprocessor having proprietary algorithms that are capable of efficiently determine gas concentration, as well as, identify specific species of gases in a sample that has reacted on the chemically-treated media. A further advantage of the present system and method is that the detection of gases in a gas detection event is visually captured and recorded, such that the results can be evaluated not only in real-time, as the event is taking place. Additionally, because the event is also recorded and stored, the results can be reviewed at a later date, while maintaining records of the events. Thus, both a visual verification and a record of the gas detection event are preserved using the present system and apparatus. In this manner the present system, method and apparatus are useful for verification of an event as a true gas alarm or a false alarm event.

Figure 1:
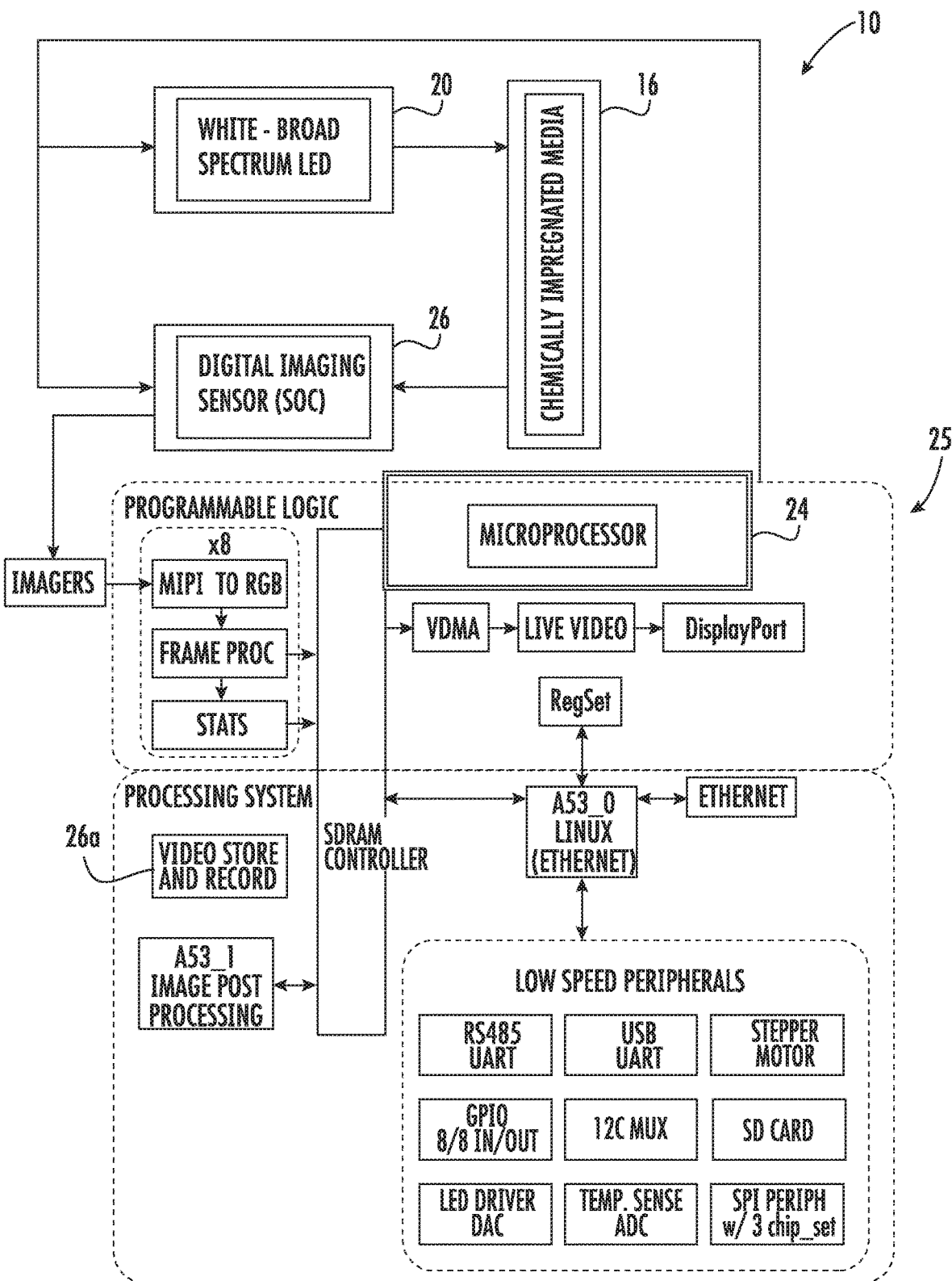
FIG. 1 illustrates a block diagram of a system incorporating the apparatus for gas detection according to the present disclosure.
Figure 2:
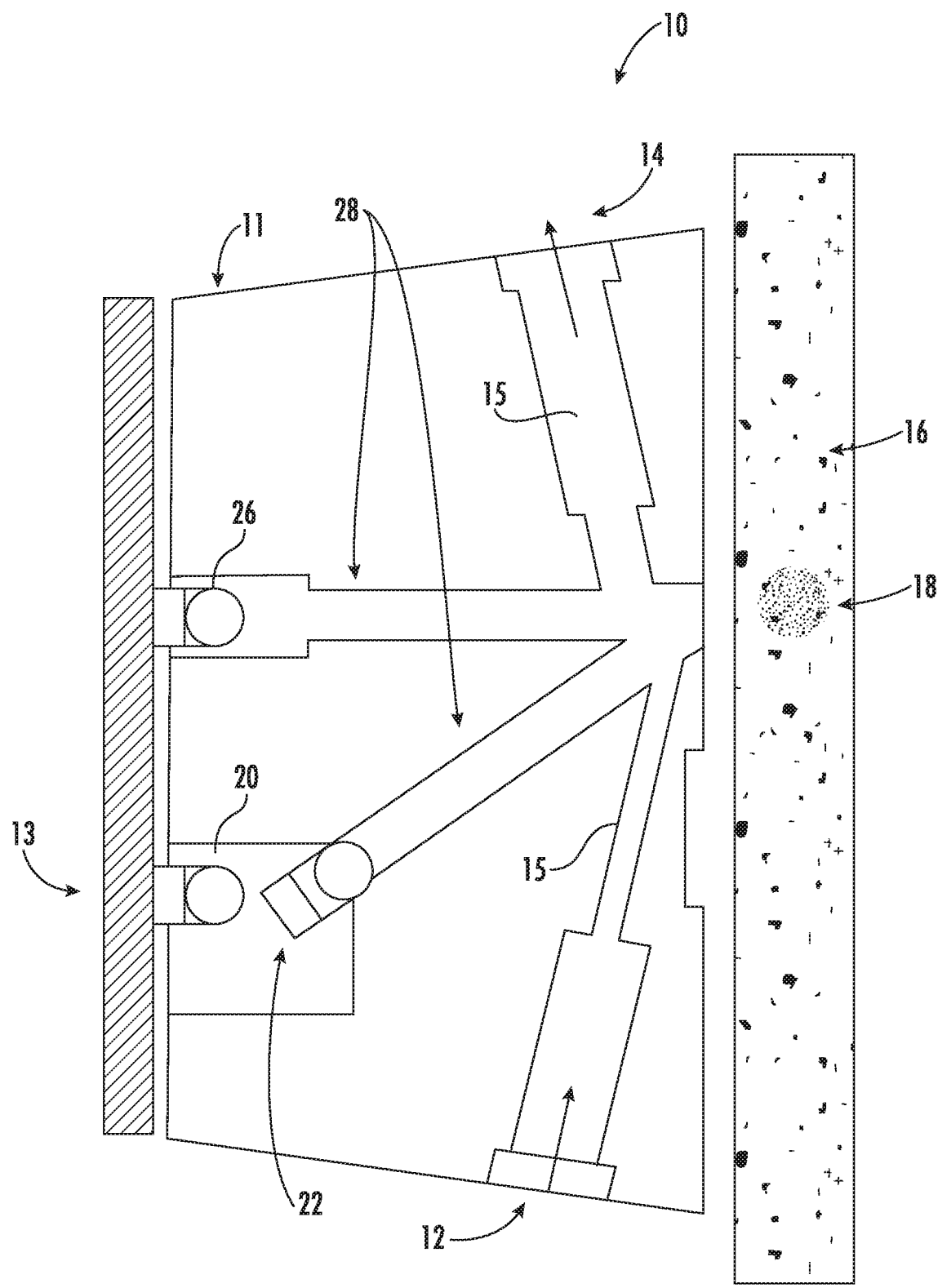
FIG. 2 illustrates an apparatus for gas detection according to the present disclosure; and, FIG. 3 illustrates a schematic diagram of a method of gas detection according to the present disclosure.
Figure 3:
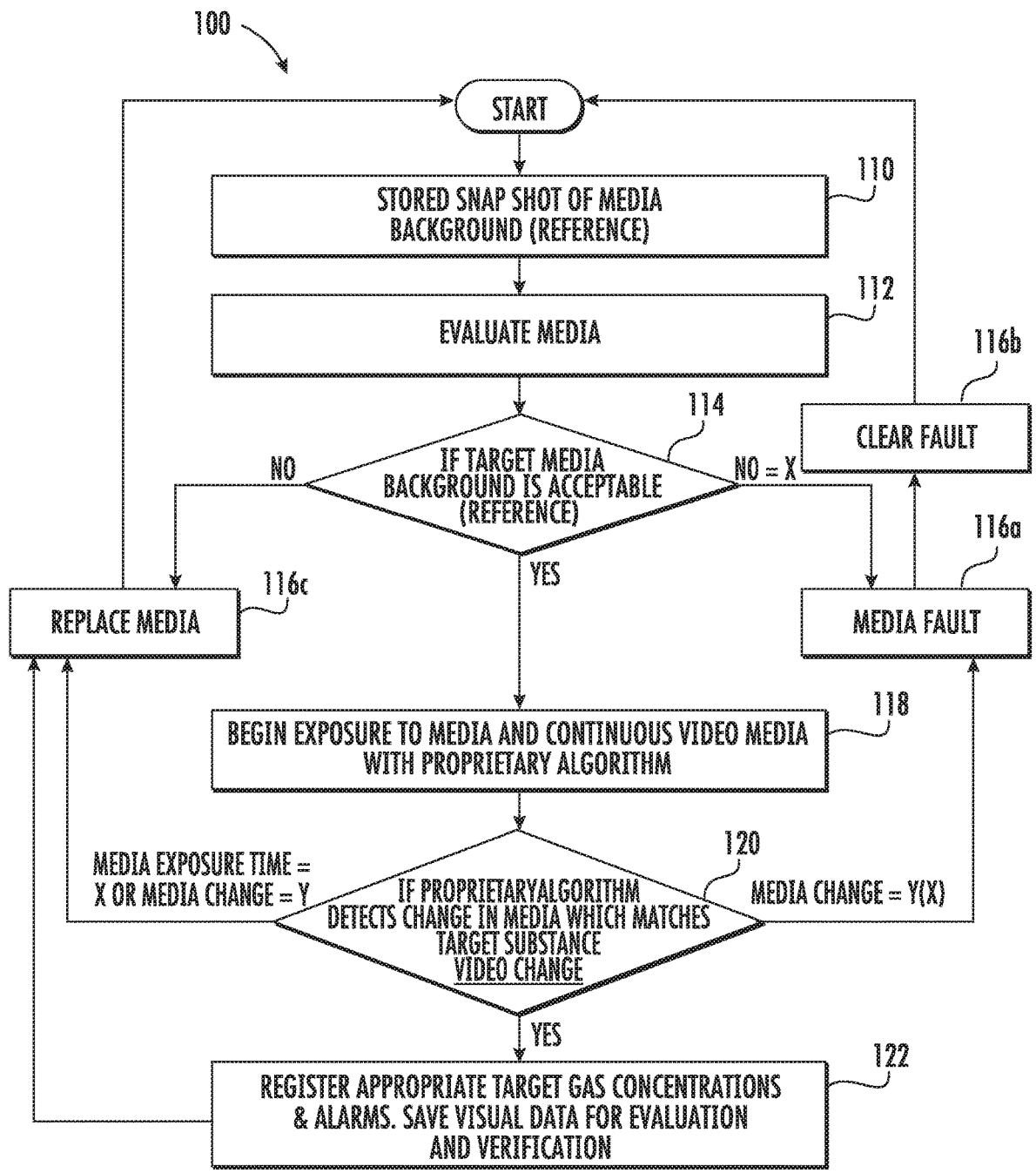

Now referring to the figures, wherein like numerals refer to like parts, FIG. 1 illustrates a block diagram of a system and gas detection apparatus 10 of the present disclosure. As seen in FIG. 1, the gas detection apparatus 10 generally includes a chemically-impregnated media 16, a broad spectrum LED light source 20, a microprocessor 24, and a digital imaging sensor 26. FIG. 2 illustrates an embodiment of a gas detection apparatus 10 useful in the present system and method of gas detection. FIG. 3 illustrates a method of gas detection utilizing the apparatus 10 of the present system, wherein the gas detection event is recorded.

FIG. 2 illustrates the components of an embodiment of a gas detection apparatus 10 useful in the present system and method of gas detection. The gas detection apparatus 10 includes an optic block 11, having a plurality of channels, including a gas flow channel 15 and optical path channels 28. The optical path channels 28 connect the LED light source 20, digital imaging sensor 26 and an optional photodiode 22 to the chemically-impregnated or treated media 16, typically a treated tape. The optical path channels 28 are separated from or atmospherically sealed from the gas flow channel 15. The LED light source 20, digital imaging sensor 26 and if used, the photodiode, these optic components are on a PC board 13, which is connected to the optic block 11.

A gas flow inlet 12 leads to the gas flow channel 15, which, during operation of the apparatus 10, directs the gas test sample toward the chemically-impregnated media 16. As the test sample flows into the gas flow inlet 12 toward the chemically-impregnated media 16, the sample interacts with the treated media 16 over the period the media is exposed to the sample gases. If a target gas or gases are present in the test sample, the treated media 16 responds to the gas and produces a stain 18. The stain 18 changes in color and intensity, which assists in determining concentrations and particular types of gases, all of which can be determined from evaluation of the changes in the stain. The sample gas exits the optic block 11 through a gas flow channel 15 to the outlet 14.

The light source used for detection of the gas or gases is a fixed, broad spectrum light emitting diode (LED) light source 20. The LED light source 20 illuminates the surface of the chemically-impregnated media 16, and the stain 18, in particular as the stain develops during the gas flow. The broad spectrum LED light source 20 used in the present gas detection apparatus 10 is a white broad spectrum LED. White broad spectrum LED light sources 20 offer advantages in gas detection over traditional LED RGB (Red, Green, and Blue) light sources because all the required wavelengths for the detection of color are present in the white broad spectrum LED light source, thereby providing continuous simultaneous detection of color. Traditional LED RBG color sources need to scan through individual specific colors, causing timing delays in color detection, which is constantly changing during gas exposure, causing longer sample times. Additionally, the white broad spectrum LED light source 20 encompasses all wavelengths in the visible spectrum of colorimetric visible detection, which offers a higher level of sensitivity, speed and reliability in colorimetric gas detection, than offered by traditional color RGB LED light sources. Thus, the traditional LED RGB light source system does not offer the same level of sensitivity, speed, or effectiveness in differentiating different species of chemicals as the white broad spectrum LED light source 20 of the present disclosure.

Furthermore, the present LED light source 20 can be adjusted for optimized intensity, as it covers a broad spectrum of visible wavelengths continuously and simultaneously. An optional broadband reference photodiode 22 can incorporated into the present apparatus 10, be used to monitor and maintain the intensity of the white broad spectrum LED light source 20. This adjustment feature of the present LED light source 20 is not possible in the traditional LED RGB system.

Operation of the LED light source 20 is accomplished through a microprocessor 24. The microprocessor 24 can adjust the LED light source 20 for optimized intensity, covering a broad spectrum of visible wavelengths simultaneously. As shown in FIG. 1, the microprocessor 24 of the present apparatus 10 further includes a proprietary software algorithm 25. The algorithm 25 is used to evaluate color changes in the stain 18 that develops when the chemically-impregnated media 16 or tape is exposed to a potential target gas or gases.

In conjunction with the LED light source 20, a digital imaging sensor 26 is incorporated into the present apparatus 10 to monitor, detect, report and record color change to the treated media 16 and the developing stain 18. The digital imaging sensor 26 is a system on a chip (SOC), which includes all necessary electronic circuits and parts for a given system, in this case, the recordation and storage of the changing image of the stain 18 as it develops on the treated media 16. Video images 26a of color and intensity changes on the treated tape 16 of the developing stain 18 are continuously sent through the digital imaging sensor 26 to the microprocessor 24 to be recorded and stored. The proprietary algorithm 25 on the microprocessor 24 evaluates the stored images to determine what type of color change has occurred on the treated tape 16. Through this evaluation, the algorithm 25 determines media background validation, gas concentration of the test sample, gas species determination and validation of the test sample, and/or invalid target cross interference. Through use of the microprocessor 24, all of the relevant information and visual data of the color changes of the particular gas event can be stored for review and validation at a later date, if needed. The resulting information is also stored for vital record-keeping purposes. This feature, the video streaming and recordation in real-time of the gas event, and capture of data, is an advantage offered by the present system, method and apparatus 10 over prior gas detection devices and methods. Not only can gas detection be accomplished as a real-time event, but the event is recorded and therefore, available for further evaluation and record-keeping. The combination of the digital imaging sensor 26 with the microprocessor 24 and associated algorithm 25 of the present apparatus is unique in the area of gas detection devices.

FIG. 3 illustrates an example of a method 100 of gas detection using the gas detection apparatus 10 of the present disclosure. Initially, a chemically-treated media 110 or tape is evaluated 112 as a background reference or control prior to exposure to the subject gas or gasses. If the media is acceptable 114, the test 118 continues. If there is a fault 116a with regard to the media 110, the media may be cleared 116b or replaced 116c, and the process starts over.

As the test continues, the chemically-treated media 16 is exposed 118 to the gas flow sample, which begins to permeate the chemically-treated media. A continuous video feed 118 begins through the digital imaging sensor 26 as previously described in relation to the gas detection device 10. The digital imaging sensor feeds the images to the microprocessor loaded with the proprietary algorithm 120, which evaluates the exposed media to determine whether or not a target species of gas or gasses is being captured by the media. The gas species detection and determination of concentrations continues simultaneously as the recording of the gas detection event continues. If the algorithm confirms the presence of a target gas, the data is saved for further evaluation and verification 122. If color changes are not caused by the target gas, but interfering objects or gases, the event is recorded for further evaluation and no detection is reported. In either case, after a particular gas detection event, the media is replaced 116c and is ready for the next event.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A gas detection apparatus comprising:
   an optic block having an inlet for entry of a gas flow specimen and an outlet for exiting the gas flow specimen, wherein the inlet and outlet are connected by at least one gas flow channel;
   a chemically treated media positioned proximate to the gas flow channel and between the inlet and the outlet for receiving and reacting to the gas flow specimen;
   a broad spectrum LED light source for illuminating the media as it is exposed to the gas flow specimen;
   a digital imaging sensor configured to capture continuous, real-time video images of changes in a single stain developing on the chemically treated media as the media is exposed to the gas flow specimen; and,
   a microprocessor for operating the LED light source and digital imaging sensor, wherein the microprocessor is configured to determine whether the changes in the single stain are caused by a target gas in the gas flow specimen and configured to determine if the changes in the single stain are caused by an interfering gas with no detection of the target gas.

2. The gas detection apparatus of claim 1, wherein the apparatus further includes a plurality of channels connecting the LED light source, the digital imaging sensor and the chemically treated media.

3. The gas detection apparatus of claim 2, wherein the plurality of channels are separate from the gas flow channel.

4. The gas detection apparatus of claim 1, wherein the digital imaging sensor optically measures development of the single stain created by the gas flow specimen on the media.

5. The gas detection apparatus of claim 1, wherein the microprocessor is configured to determine a type of gas species and concentration levels in the gas flow sample.

6. The gas detection apparatus of claim 1 wherein the broad spectrum LED light source is a white broad spectrum LED.

7. The gas detection apparatus of claim 1 wherein the apparatus further includes at least a second photodiode for optically monitoring an intensity level of the LED light source.

8. A method of gas detection and evaluation, the method comprising the steps of:
   providing an optic block having a plurality of channels;
   flowing a gas sample into an inlet and through at least one of the plurality of channels and across a chemically treated media;
   reacting the chemically treated media with the gas sample to produce a single stain;
   transmitting a broad spectrum LED light source through at least one of the plurality of channels toward the chemically treated media;
   reflecting color changes to the single stain through at least one of the plurality of channels to a digital imaging sensor;
   measuring the reflected color changes to the single stain using the digital imaging sensor:
   recording continuous video images of the single stain with the digital imaging sensor as the stain develops on the media;
   evaluating the images of the single stain using a microprocessor configured to evaluate if a color change has occurred indicating a target gas in the gas sample; and,
   automatically replacing the chemically treated media providing continuous detection of the gas sample.

9. The method of claim 8, wherein the step of measuring the single stain further includes detecting a concentration of the target gas in the gas sample.

10. The method of claim 9, wherein the step of measuring the single stain further includes determining a specific target gas species in the gas sample.

11. The method of claim 10, wherein the step of measuring the single stain further includes quantifying a specific color of the stain to the specific target gas species in the gas sample.

12. The method of claim 8, wherein the method further includes storing the images of the single stain within the microprocessor for later evaluation.

13. A system of gas detection and recordation of a gas detection event in real-time, the system comprising:
   a gas detection device configured for automatic and continuous detection, the device comprising;
      an optic block having an inlet for entry of a gas flow specimen into a housing, and an outlet for exiting the gas flow specimen from the housing, wherein the inlet and outlet are connected by at least one gas flow channel;
      a chemically treated media positioned proximate to the gas flow channel and between the inlet and the outlet for receiving a gas flow specimen requiring detection of a target gas component or gas components;
      a broad spectrum LED light source for illuminating the media as it is exposed to the gas flow specimen;
      a digital imaging sensor for detecting the target gas components or gas components in the gas flow specimen through a color change in a stain as it develops in real time; and,
      a microprocessor configured for operating the LED light source and digital imaging sensor and for storing the recording of the color change in the stain of the gas flow specimen for later analysis and verification of at least one target gas component of the gas detection event and for verification of an interfering, non-target gas and no further detection.

14. The system of claim 13, wherein the digital imaging sensor creates an image of the gas components of the gas flow specimen.

15. The system of claim 14, wherein the microprocessor determines species and concentrations of the target gas component or gas components of the gas flow specimen.

* * * * *